Nov. 13, 1956 W. JUDA ET AL 2,770,776
FREQUENCY METER
Original Filed July 9, 1949
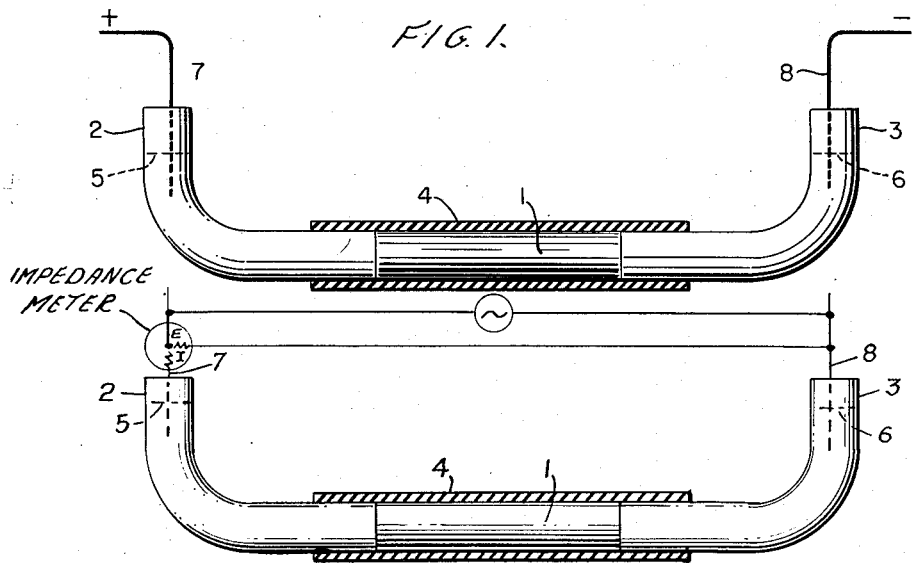
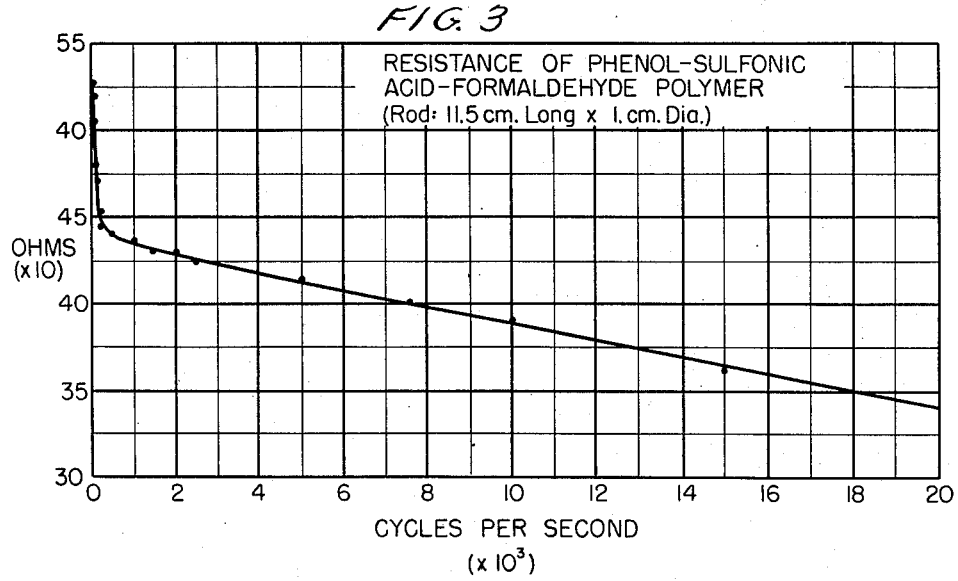
INVENTORS
WALTER JUDA
WAYNE A. McRAE
BY
ATTORNEYS United States Patent Office 2,770,776
Patented Nov. 13, 1956

2,770,776

FREQUENCY METER

Walter Juda, Lexington, and Wayne A. McRae, Arlington, Mass., assignors to Ionics, Incorporated, Cambridge, Mass., a corporation of Massachusetts Original application July 9, 1949, Serial No. 103,784, now Patent No. 2,636,851, dated April 28, 1953. Divided and this application April 14, 1953, Serial No. 348,722

1 Claim. (Cl. 324—78)

This application is a division of our copending application Serial No. 103,784, filed July 9, 1949, now Patent No. 2,636,851, issued April 28, 1953, in which are disclosed what may be characterized as solid unfractured structures having at least two dimensions each in excess of 0.25 inch, and comprising as an essential part extending substantially throughout, a predominant amount of an ion exchange resin which comprises: an insoluble infusible synthetic organic polymeric matrix, dissociable ionic groups chemically bonded to said matrix and water in gel relationship with said matrix. The ionic groups have a dissociation constant (K) of at least $10^{-5}$ and are present in an amount of at least 3.0 milliequivalents per gram of dry resin when K is between $10^{-5}$ and $10^{-3}$ and in an amount of at least 0.3 milliequivalent per gram of dry resin when K is $10^{-3}$ or greater. The water is present in an amount of at least 15% of the weight of dry resin.

A preferred manner of forming such structures consists in forming an aqueous dispersion of material polymerizable into an ion exchange resin, containing at least 15% water on the weight of dry resin, and effecting polymerization of the material under conditions preventive of the escape of water from the dispersion. There is thereby formed a structure in which the ion exchange resin presents a homogeneous continuous phase throughout the structure.

The present invention provides novel electrolysis equipment useful for numerous electrical measurements such as the measurement of frequency, or the number of coulombs passed by an electrical circuit.

According to the invention the structure comprising an ion exchange resin (as defined above) is placed in direct contact with a pair of spaced metallic conductors, whereby an alternating current may be passed through the structure. It has been found that the resistance or impedance of the structure varies substantially linearly with the frequency of the current, whereby a measurement of the resistance may be translated (on the basis of a previous calibration) into a corresponding frequency value.

Inasmuch as the present invention is directed to such novel electrolysis effects which may be realized in such structures, rather than to the structures or their formation, per se a further description of the structures and their formation is unnecessary for an understanding of this invention, reference being made to our above-identified copending application for a detailed description of such structures.

Our invention will be better appreciated and understood from the following detailed description of preferred embodiments thereof, and from the drawings in which:

Fig. 1 is an elevational diagrammatic view of an assembly of a rod of the structure of ion exchange resin between two columns of mercury for the passage of an electric current therethrough, and, Fig. 2 is a graph representing the variation in resistance or impedance of a structure of ion exchange resin with respect to alternating electric current of differing frequencies.

Figure 3 is an elevational diagrammatic view of an assembly of the frequency meter of the present invention wherein an alternating current is passed through said meter and which includes an impedance meter, like numerals for like parts being indicated as in Figure 1.

EXAMPLE 1

*Electrolysis in the ion-exchange medium*

| | Parts |
|---|---|
| Sulfuric acid (95.5%) | 100 |
| Phenol | 79 |
| Formaldehyde (37%, in water) | 129 |

The phenol was melted and heated to 95° C., the sulfuric acid added and the mixture heated at 140° C. for two hours and then cooled to 15° C. The phenol-sulfuric acid mixture was added to the formaldehyde which had been cooled to 0° C., additional cooling being provided to keep the temperature below 20° C. The resulting mixture may be stored for weeks at 5° C.

The unpolymerized liquid was poured into a cylindrical glass mold and polymerized at 60° C. until dark in color. The rod was conditioned by soaking in distilled water until substantially all water-soluble reagents were removed. The resulting cation exchange rod 1 (Fig. 1), 5.2 cm. long and 1.2 cm. in diameter, was mounted between the rods of glass tubes 2, 3, in a rubber tubing 4 as shown. The glass tubes 2, 3, were filled with mercury at 5 and 6 into which were dipped platinum electrodes 7 and 8. A direct current (Fig. 1.) of 4 milliamperes developed when a potential of 6 volts was imposed on the system, the current being carried ionically in the cast rod, for a constant D. C. potential varying slightly with time, giving rise to an evolution of hydrogen gas at the mercury-exchanger interface adjacent to the positive terminal. Much of the oxygen combined with the mercury at the interface to give oxides of mercury. If the rod is kept wet with water, the electrolysis may be continued. Measuring the volume of evolved hydrogen at constant pressure gives a measure of the number of coulombs passed by the electrical circuit. The system may be used as a convenient coulombmeter.

Upon closing the circuit an instantaneous very high current of 0.04 ampere was observed which dropped to the steady value given above. This unusual behavior illustrates the novel nature of this type of electrolysis.

EXAMPLE 2

*The novel electrical properties of cast ion-exchange materials for the measurement of frequency of an electric field*

| | Parts |
|---|---|
| Sulfuric acid (95.5%) | 108 |
| Phenol | 100 |
| Formaldehyde (37%) | 130 |

The phenol and sulfuric acid were mixed together, heated at 130° C. for three hours, cooled to 15° C. and added to the formaldehyde which had been chilled to 0° C., additional cooling being provided to keep the temperature below 20° C. The mixture was a reddish-brown, oily liquid. It may be stored for weeks at 5° C. The liquid was poured into a cylindrical glass mold and polymerized at 60° C. until black in color. The resulting rod was conditioned by soaking in distilled water and then in 2 N HCl and finally was washed free from HCl with distilled water. The resistance of this water-saturated rod was measured in a direct current, and in alternating currents of varying frequencies. It was found to decrease at a rate of $4.7 \times 10^{-3}$ ohm-seconds per cycle in the range of 1,000 to 20,000 cycles per second, the variation being shown in the graph of Figure 2. This method permits one to measure the frequency of an applied alternating current (Fig. 3) by measuring the resistance of a calibrated resin rod.

Having thus disclosed our invention and described in detail preferred embodiments thereof, we claim and desire to secure by Letters Patent:

A frequency meter comprising a solid unfractured structure comprising as an essential part extending substantially throughout, a predominant amount of a homogeneous continuous phase of an ion exchange resin which comprises: an insoluble infusible synthetic organic polymeric matrix, dissociable ionic groups chemically bonded to said matrix, and water in gel relationship with said matrix; said groups having a dissociation constant of at least $10^{-5}$ and being present in an amount of at least 0.3 milliequivalent per gram of dry resin, and said water being present in an amount of at least 15% of the weight of dry resin, a pair of spaced metallic conductors in direct contact with said solid unfractured structure, and means for measuring impedance of said structure whereby the frequency may be determined.

References Cited in the file of this patent

UNITED STATES PATENTS

| | | |
|---|---|---|
| 680,233 | Doane | Aug. 13, 1901 |
| 682,351 | Chesney et al. | Sept. 10, 1901 |
| 770,033 | Wood | Sept. 13, 1904 |
| 1,902,496 | FitzGerald | Mar. 21, 1933 |
| 2,614,976 | Patnode et al. | Oct. 21, 1952 |
| 2,636,851 | Juda et al. | Apr. 28, 1953 |